US011860183B2

United States Patent
Stoerk et al.

(10) Patent No.: US 11,860,183 B2
(45) Date of Patent: Jan. 2, 2024

(54) TEMPERATURE DEPENDENT ACCELERATION CURRENT SOURCE CIRCUITRY

(71) Applicant: Texas Instruments Incorporated, Dallas, TX (US)

(72) Inventors: Carsten Ingo Stoerk, Freising (DE); Johann Erich Bayer, Freising (DE); Ruediger Ganz, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 136 days.

(21) Appl. No.: 17/404,225

(22) Filed: Aug. 17, 2021

(65) Prior Publication Data
US 2023/0055100 A1 Feb. 23, 2023

(51) Int. Cl.
*G01K 3/10* (2006.01)
*G01P 1/00* (2006.01)
*G05F 3/30* (2006.01)

(52) U.S. Cl.
CPC .............. *G01P 1/006* (2013.01); *G01K 3/10* (2013.01); *G05F 3/30* (2013.01)

(58) Field of Classification Search
CPC ...................................... G01K 3/10

USPC ........................................ 374/107
See application file for complete search history.

(56) References Cited

U.S. PATENT DOCUMENTS 7,982,438 B2 7/2011 Gerber
2017/0264199 A1* 9/2017 Kimura ............... H02M 7/44

\* cited by examiner

*Primary Examiner* — Walter L Lindsay, Jr.
*Assistant Examiner* — Philip T Fadul
(74) *Attorney, Agent, or Firm* — Ray A. King; Frank D. Cimino

(57) ABSTRACT

Systems, methods, and circuitries are provided for generating an acceleration current in response to a threshold temperature being reached. In one example, temperature based acceleration current source circuitry includes a first temperature sensitive device, a second temperature sensitive device, differential trigger circuitry, and an acceleration current source. The first temperature sensitive device is configured to generate a first signal that varies responsive to temperature changes at a first rate. The second temperature sensitive device is configured to generate a second signal that varies responsive to temperature changes at a second rate. The differential trigger circuitry is configured to generate a trigger signal based on a difference between the first signal and the second signal. The acceleration current source circuitry is configured to output an acceleration current in response to the trigger signal.

25 Claims, 9 Drawing Sheets

TEMPERATURE DEPENDENT
ACCELERATION CURRENT SOURCE
CIRCUITRY

TECHNICAL FIELD

The technical field of this invention is controlling the refresh rate of a reference voltage sampled on a capacitor and an electronic device with a corresponding circuit.

BACKGROUND

Many components of integrated circuits (ICs), especially analog integrated circuits, function in a manner that varies depending on temperature. Proportional to absolute temperature (PTAT) circuits are used to generate "PTAT currents and/or voltages" that vary in a predictable manner with respect to temperature. The PTAT currents and/or voltages are used to control modification of the operation of temperature dependent components to compensate for temperature induced variations.

SUMMARY

In one example, temperature based acceleration current source circuitry includes differential trigger circuitry, a first temperature sensitive device, a second temperature sensitive device, and an acceleration current source. The differential trigger circuitry includes a diode device biased by a first leakage current to generate a bias voltage and a trigger device biased by the bias voltage. The first temperature sensitive device is coupled in parallel between the diode device and a common node. The first leakage current flows through the first temperature sensitive device and the first leakage current varies responsive to temperature changes at a first rate. The second temperature sensitive device is coupled in parallel between the trigger device and the common node. A second leakage current flows through the second temperature sensitive device and the second leakage current varies responsive to temperature changes at a second rate. The acceleration current source is coupled to the trigger device. The acceleration current source is configured to, in response to activation by the trigger device, conduct an acceleration current generated by a source voltage to an output of the temperature based acceleration current source circuitry. The trigger device is controlled by a difference between the first leakage current and a second leakage current to selectively activate the acceleration current source.

In one example, a watchdog circuit includes an integrator circuit, a capacitor, and temperature based acceleration current source circuitry. The integrator circuit is configured to generate an output pulse in response to an input voltage exceeding a threshold. The capacitor is coupled in parallel with the integrator circuit. The capacitor is coupled to a proportional to absolute temperature (PTAT) circuit and is charged by a current generated by the PTAT circuit. A voltage across the capacitor corresponds to the input voltage to the integrator circuit. The temperature based acceleration current source circuitry is coupled to the capacitor. An acceleration current output by the temperature based acceleration current source circuitry charges the capacitor. The temperature based acceleration current source circuitry is configured to selectively output the acceleration current in response to an ambient temperature reaching a target.

In one example, a method includes: generating a first signal that varies responsive to temperature changes at a first rate; generating a second signal that varies responsive to temperature changes at a second rate; generating a trigger signal in response to a difference between the first signal and the second signal exceeding a threshold; and outputting an acceleration current in response to the trigger signal.

In one example, temperature based acceleration current source circuitry includes a first temperature sensitive device, a second temperature sensitive device, differential trigger circuitry, and an acceleration current source. The first temperature sensitive device is configured to generate a first signal that varies responsive to temperature changes at a first rate. The second temperature sensitive device is configured to generate a second signal that varies responsive to temperature changes at a second rate. The differential trigger circuitry is configured to generate a trigger signal based on a difference between the first signal and the second signal. The acceleration current source circuitry is configured to output an acceleration current in response to the trigger signal.

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

The drawings may not be drawn to scale.

PTAT circuits are useful in compensating for temperature dependent variations in electronic components. PTAT circuits are designed to exhibit a predictable (e.g., linear) response to changes in temperature over a wide range of temperatures. However, some circuits may exhibit an acceleration in temperature dependent variation at some threshold temperature, leading to potential runaway or cascade degradation in performance. Described herein is temperature dependent acceleration current source circuitry that, rather than generating a current that exhibits a constant variation responsive to temperature changes, outputs an "acceleration current" in response to a threshold temperature being reached. As used herein, "acceleration current" is shorthand for a current that is near nil until a threshold temperature and then exhibits a steep rise to a plateau current within a relatively narrow range of temperature with respect to the threshold temperature. During operation, until the threshold temperature is reached, the acceleration current is nil or negligible. In this manner, the acceleration current may be used compensate for a rapid acceleration in temperature dependent variations experienced by electronic components at differing temperatures.

Figure 1A:
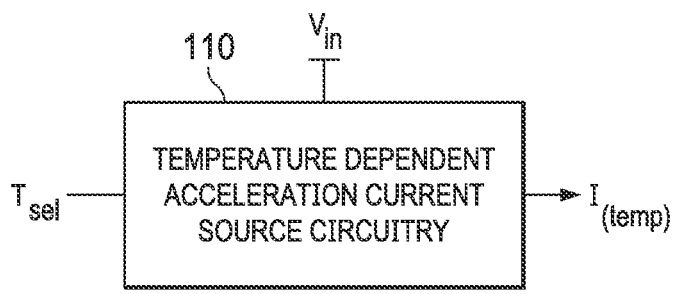
FIG. 1A is a block diagram depicting example temperature dependent acceleration current source circuitry, according to one aspect of the description.

FIG. 1A is a block diagram depicting example temperature dependent acceleration current source circuitry 110 that outputs an acceleration current ($I_{(temp)}$) in response to a threshold temperature being reached. The threshold temperature is controlled by a temperature selection input signal $T_{sel}$. The temperature dependent acceleration current source circuitry 110 is powered by an input voltage $V_{in}$ which is used to generate the acceleration current. In one example, the temperature dependent acceleration current source circuitry 110 draws minimal current (e.g., on the order of picoamperes) when the ambient temperature is lower than the threshold temperature.

Figure 1B:
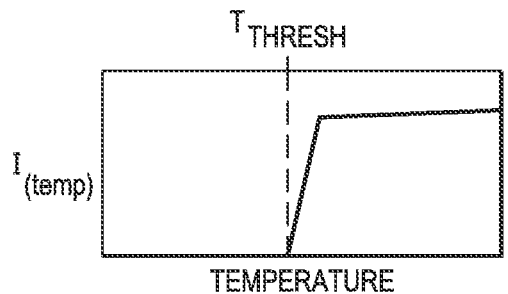
FIG. 1B is a plot illustrating current output by the temperature dependent acceleration current source circuitry of FIG. 1A responsive to temperature changes.

FIG. 1B is a plot depicting acceleration current output by the temperature dependent acceleration current source circuitry 110 versus temperature. The acceleration current is negligible or nil until the threshold temperature $T_{THRESH}$ is reached. In response to the threshold temperature being reached, the temperature dependent acceleration current source circuitry 110 outputs a rapidly increasing (responsive to temperature changes) acceleration current that plateaus within a narrow range of increasing temperature (e.g., an increase of 8 nanoamperes within a range of 18 degrees Celsius from $T_{THRESH}$).

Figure 2:
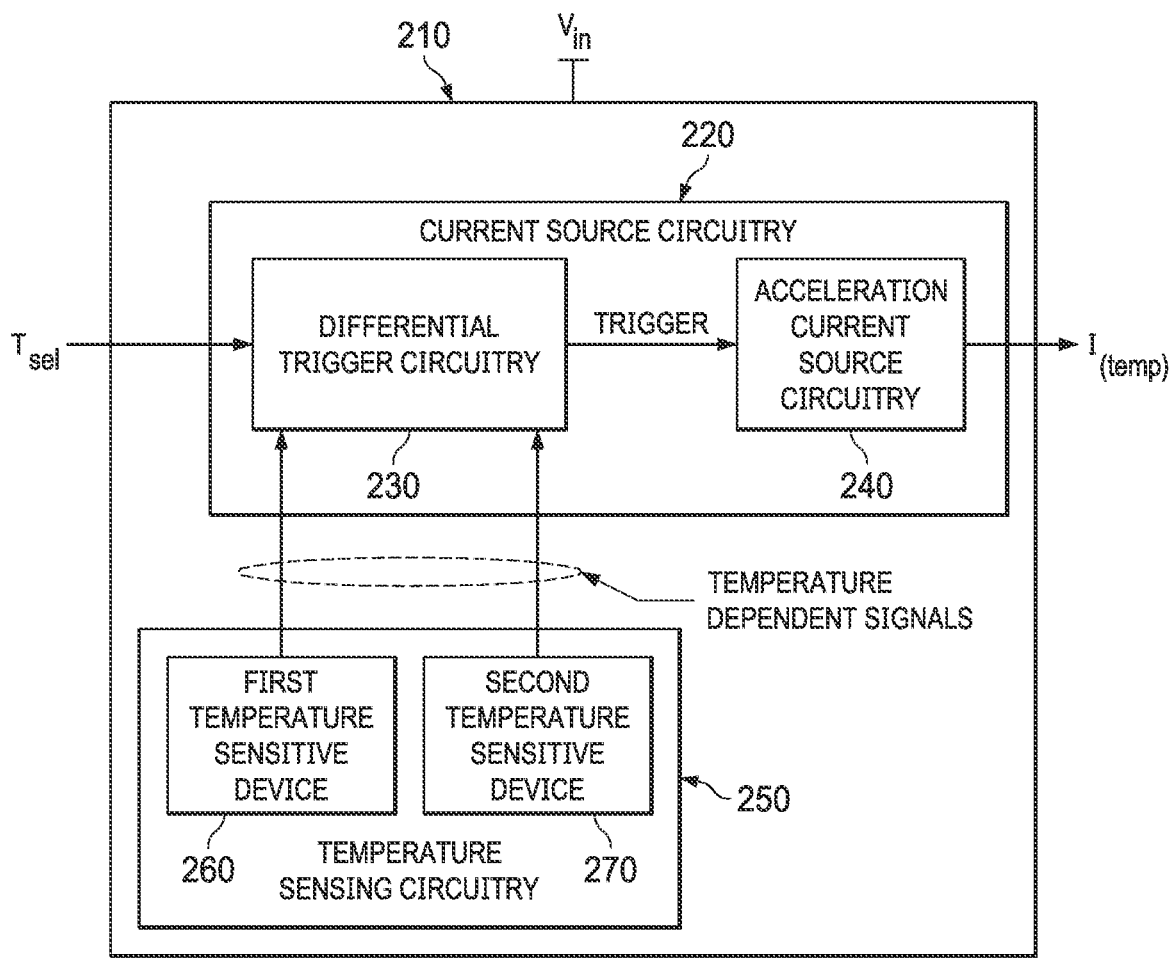
FIG. 2 is a block diagram depicting example temperature dependent acceleration current source circuitry, according to one aspect of the description.

FIG. 2 is a block diagram depicting example temperature dependent acceleration current source circuitry 210, which is an example of the temperature dependent acceleration current source circuitry 110 of FIG. 1. The temperature dependent acceleration current source circuitry 210 includes current source circuitry 220 and temperature sensing circuitry 250. The temperature sensing circuitry 250 includes a first temperature sensitive device 260 configured to generate a first signal that varies according to a first rate responsive to changes in temperature. The temperature sensing circuitry 250 includes a second temperature sensitive device 270 configured to generate a second signal that varies according to a second rate responsive to changes in temperature. The difference between the first signal and the second signal depends on temperature due to the difference in temperature-related variation between the first and second signals.

In one example, the first signal is a leakage current that is exhibited by or characteristic of the first temperature sensitive device and the second signal is a leakage current that is exhibited by or characteristic of the second temperature sensitive device. The first and second temperature sensitive devices may be designed or selected to exhibit leakage currents having temperature-related dependence with a predetermined ratio to control the operation of the temperature dependent acceleration current source circuitry 210. For example the ratio of leakage currents is one factor that controls the threshold temperature current (see FIG. 1B, $T_{THRESH}$) at which the acceleration current (see FIG. 1B, $I_{(temp)}$) is triggered. In one example the leakage current is source-drain leakage current including a weak inversion (sub-threshold) current and a punch-through current. Both of these components show a temperature dependency that can serve as the basis for triggering the acceleration current.

The current source circuitry 220 includes differential trigger circuitry 230 and acceleration current source circuitry 240. The differential trigger circuitry 230 is configured to generate a trigger signal based on a difference between the first signal and the second signal. In one example, the differential trigger circuitry 230 is configured to generate the trigger signal in response to a difference between a leakage current of the second temperature sensitive device 270 and a leakage current of the first temperature sensitive device 260 exceeding a threshold. The temperature at which the differential trigger circuitry generates the trigger signal can be controlled or selected by a temperature selection input signal $T_{sel}$. This feature will be described in more detail with reference to FIGS. 3 and 5. The acceleration current source circuitry 240 is configured to output the acceleration current ($I_{(temp)}$) in response to the trigger signal.

Figure 3:
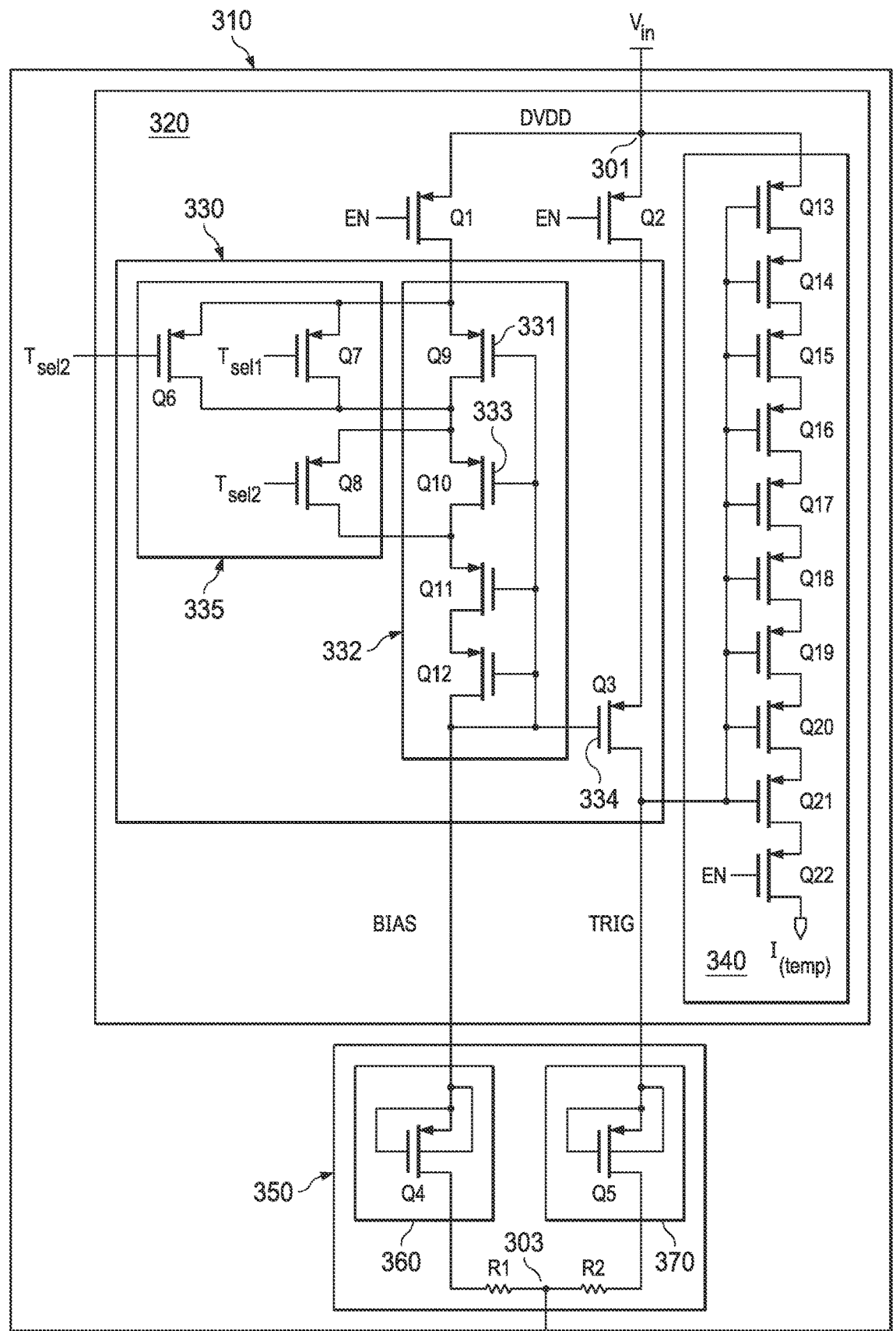
FIG. 3 is a schematic diagram depicting example temperature dependent acceleration current source circuitry, according to one aspect of the description.

FIG. 3 is a schematic diagram depicting example temperature dependent acceleration current source circuitry 310, which is an example of the temperature dependent acceleration current source circuitries 110, 210 of FIGS. 1 and 2, respectively. The temperature dependent acceleration current source circuitry 310 includes current source circuitry 320 and temperature sensing circuitry 350. The temperature dependent acceleration current source circuitry includes three enable (EN) inputs that each responds to an enable signal to switch on associated EN MOS transistors to enable current flow in three separate branches.

The temperature sensing circuitry 350 is an example of temperature sensing circuitry 250 of FIG. 2 and includes resistors R1 and R2, and first temperature sensitive device 360 and second temperature sensitive device 370, which are examples of first temperature sensitive device 260 and second temperature sensitive device 270, respectively. Current source circuitry 320 is an example of current source circuitry 220 of FIG. 2 and includes transistors Q1 and Q2, and differential trigger circuitry 330 and acceleration current source circuitry 340, which are examples of differential trigger circuitry 230 and acceleration current source circuitry 240, respectively.

First temperature sensitive device 360 includes a transistor Q4, and temperature sensitive device 370 includes a transistor Q5. Differential trigger circuitry 330 includes trigger temperature selection circuitry 335, a diode device 332 and a trigger device Q3. Trigger temperature selection circuitry 335 includes transistors Q6, Q7, and Q8. Diode device 332 includes transistors Q9, Q10, Q11, and Q12. Trigger device 334 (Q3) includes transistor Q3. Acceleration current source circuitry 340 includes transistors Q13, Q14, Q15, Q16, Q17, Q18, Q19, Q20, Q21, and Q22. Also illustrated is an input voltage source $V_{in}$ coupled to an internal input voltage node 301 of temperature dependent acceleration current source circuitry 310 and an electrical ground 305 coupled to an internal "common" node 303 of temperature dependent acceleration current source circuitry 310.

Figure 4:
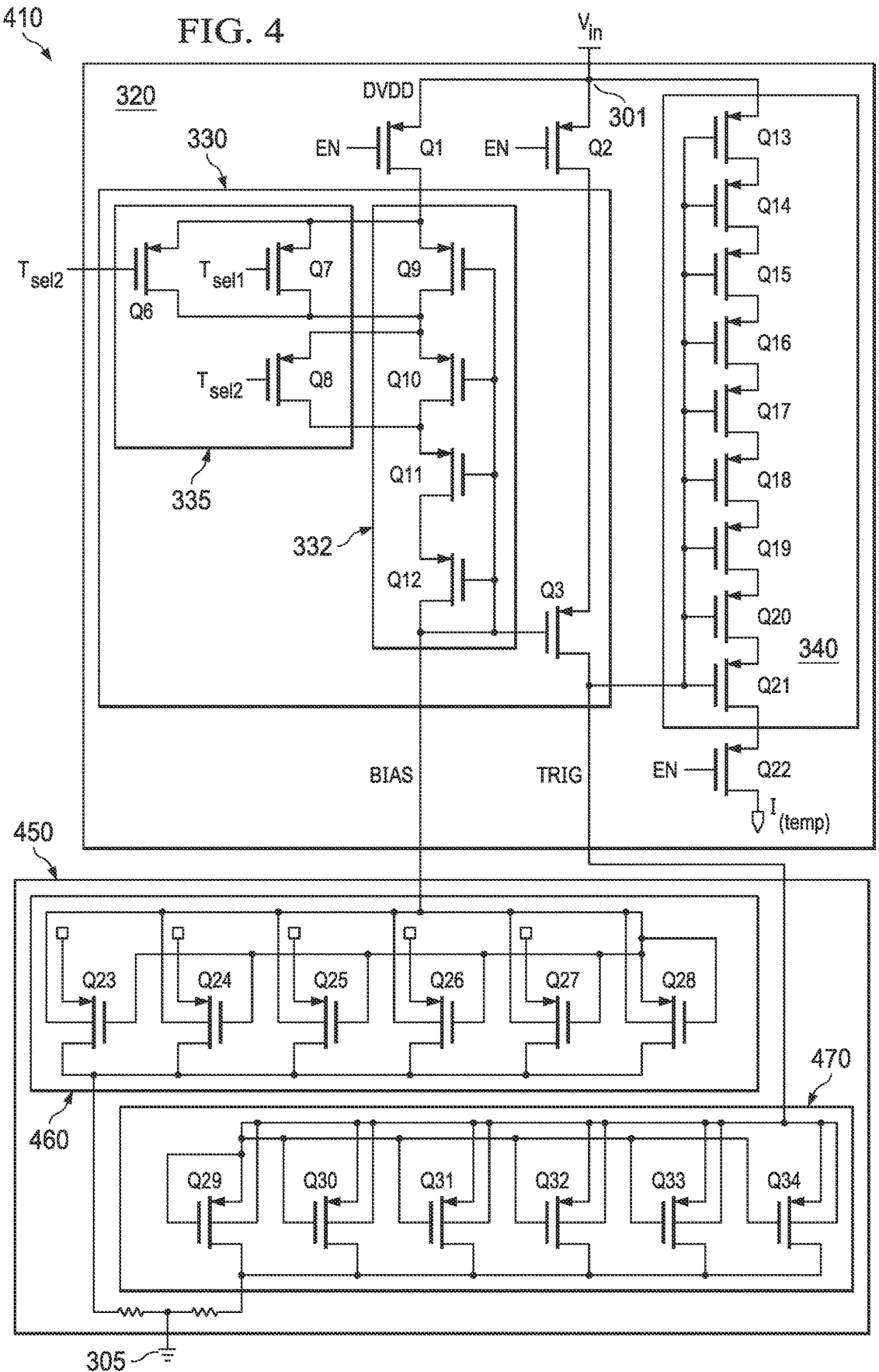
FIG. 4 is a schematic diagram depicting example temperature dependent acceleration current source circuitry, according to one aspect of the description.

In this example, transistors Q1-Q22 are field-effect transistors (FET), and in particular metal-oxide semiconductor field-effect transistor (MOSFETs), and more in particular p-type MOSFETs, also referred to herein as p-channel or p-type MOSFETs (also referred to as PMOS transistors). Accordingly, transistor Q3 is also referred to herein interchangeably as a "trigger MOS device." Also, the example of FIG. 4 includes devices and circuits implemented with PMOS transistors. FETs have a gate as a control terminal and a source and drain as first and second transistor terminals. In other examples, one or more of transistors Q1-Q22 and transistors in FIG. 4 are n-channel or n-type MOSFETs (also referred to as NMOS transistors) or bipolar junction transistors (BJTs) with appropriate characteristics. BJTs have a base as a control terminal and a collector and emitter as first and second transistor terminals.

As illustrated, the respective sources of transistors Q1, Q2, and Q13 are coupled to input voltage node 301. The respective sources of transistors Q6, Q7, and Q9 are coupled to the drain of transistor Q1. The respective drains of transistors Q6, Q7, and Q9 are coupled to the respective sources of transistors Q8 and Q10. The respective drains of transistor Q8 and Q10 are coupled to the source of transistor Q11. The drain of Q11 is coupled to the source of Q12 and the drain of Q12 is coupled to a gate of Q3 and a source and gate of Q4. The drain of Q2 is coupled to the source of Q3. The drain of Q3 is coupled to the source and gate of Q5 and the respective gates of Q13, Q14, Q15, Q16, Q17, Q18, Q19, Q20, and Q21. The drain of Q13 is coupled to the source of Q14. The drain of Q14 is coupled to the source of Q15. The drain of Q15 is coupled to the source of Q16. The drain of Q16 is coupled to the source of Q17. The drain of Q17 is coupled to the source of Q18. The drain of Q18 is coupled to the source of Q19. The drain of Q19 is coupled to the source of Q20. The drain of Q20 is coupled to the source of Q21. The drain of Q21 is coupled to the source of Q22. The drain of Q22 provides the acceleration current $I_{(temp)}$. The respective drains of Q4 and Q5 are coupled to the common node 303.

Trigger temperature selection circuitry 335 is illustrated as including three transistors. However, a different number of transistors may be included depending on desired power capacity or other factors. Diode device 332 is illustrated as including four transistors. However, a different number of transistors may be included depending on desired power capacity or other factors. Acceleration current source 340 is illustrated as including ten transistors. However, a different number of transistors may be included depending on desired power capacity or other factors. First temperature sensitive device 360 is illustrated as including a single transistor. However, a different number of transistors may be included depending on desired power capacity or other factors. Second temperature sensitive device 370 is illustrated as including a single transistor. However, a different number of transistors may be included depending on desired power capacity or other factors.

First temperature sensitive device 360 exhibits a first leakage current (indicated generally as BIAS) that varies at a first rate depending on temperature. Second temperature sensitive device 370 exhibits a second leakage current (indicated generally by TRIG) that varies a second rate, higher than the first rate, depending on temperature. An example leakage current (e.g., the BIAS or TRIG current) ranges from about 100 to 600 picoamperes. The first temperature sensitive device 360 and the second temperature sensitive device 370 are coupled in parallel with one another between current source circuitry 320 and a common node 303.

The BIAS current (leakage current through first temperature sensitive device 360) generates a BIAS voltage that is provided to the respective gates of the transistors of the diode device 332 Q9, Q10, Q11, and Q12 and also to the gate of the trigger MOS transistor Q3.

The operating region (e.g., saturation, triode, or cut-off) of the trigger MOS transistor Q3 is determined by a difference between the BIAS voltage present at the gate of MOS transistor Q3 and a TRIG voltage generated by the TRIG current (leakage current through second temperature sensitive device 370) present at its drain. As temperature increases the BIAS current increases at a first rate dependent on the characteristics of the first temperature sensitive device 360. Similarly, as temperature increases the TRIG current increases at a second rate dependent on the characteristics of the second temperature sensitive device 370. Some example characteristics of the first temperature sensitive device 360 and the second temperature sensitive device 370 that control the first rate and second rate, respectively, are described with reference to FIG. 4. In the following examples, the TRIG current increases at a faster rate than the BIAS current. The opposite relationship may also be used in other examples. The difference between the first and second rates causes the TRIG voltage to diverge from the BIAS voltage so that the difference between the TRIG voltage and BIAS voltage varies responsive to temperature changes.

The TRIG current controls the drain-to-source voltage across the trigger MOS transistor Q3. When the TRIG current is close to the BIAS current the trigger MOS transistor Q3 exhibits a low drain-to-source voltage and the trigger MOS transistor Q3 operates in triode region. When the TRIG current becomes high enough (e.g., reaches the saturation current of trigger MOS transistor Q3) due to temperature induced leakage in the second temperature sensitive device 370, the trigger MOS transistor Q3 transitions from triode region to saturation region, leading to a rapid increase of the TRIG voltage.

The drain of the trigger MOS transistor Q3 (the TRIG voltage) is coupled to the gates of the MOS transistors of the acceleration current source 340. When the trigger MOS transistor Q3 operates in triode region, the drain voltage is insufficient to switch the staged MOS transistors of the acceleration current source 340 to an ON state, or simply ON. However, when the trigger MOS transistor operates in saturation region, the drain voltage becomes sufficient to turn the MOS transistors of the acceleration current source to ON (e.g., saturation region), allowing the acceleration current $I_{(temp)}$ to flow out of the acceleration current source circuitry 340, at the drain of transistor Q22. The number of MOS transistors in the acceleration current source circuitry may be selected to control the level of the acceleration current.

The trigger temperature selection circuitry 335 provides temperature selection signal ($T_{sel1}, T_{sel2}$) for selecting a threshold temperature. Each respective temperature selection input signal turns on one or more associated MOS transistors Q6, Q7, Q8 of the diode device 332. When Q6 is activated by $T_{sel1}$ a shorting path is created around device 331 (Q9). The shorting path "shorts" Q9 and reduces the resistance of the diode device 332. When Q7 and Q8 are activated by $T_{sel2}$, a shorting path is created around device 331 and device 333 (Q10), further reducing the resistance of the diode device 332. Using a specific combination of temperature selection inputs, the BIAS current is adjusted up or down relative to the TRIG current. In this manner the point at which the difference between the BIAS and TRIG voltages becomes large enough to drive the trigger MOS transistor Q3 into the saturation region can be adjusted. For example when both temperature selection signals have a high level neither device transistor Q9 nor device Q10 is shorted. When $T_{sel1}$ is has a low level and $T_{sel2}$ has a high level, device Q9 is shorted. When $T_{sel1}$ is has a high level and $T_{sel2}$ is has a low level or both signals have low levels, both device Q9 and Q10 are shorted.

Activating one of the shorting paths lowers the resistance of the diode device 332 which increases the BIAS voltage. Accordingly, the BIAS voltage, at lower temperatures, is further from the TRIG voltage than it would be with none of the shorting paths activated. This means that the difference between the BIAS and TRIG voltages becomes sufficient to saturate the trigger MOS transistor Q3 at a lower temperature. In other words, when one or more shorting paths are activated the resistance of the diode device 332 is reduced, thereby leading to a decrease in the gate-to-source voltage of the trigger MOS transistor Q3. The reduction in gate-to-source voltage of the trigger MOS transistor Q3 reduces the saturation current of the trigger MOS transistor Q3, which leads to a lower temperature trigger point. The shift in trigger point is because the leakage current of second temperature sensitive device 370 remains the same, while the current capability of the trigger MOS transistor Q3 is reduced, leading to a triggering at a lower temperature. In general, the more shorting paths that are activated the lower the temperature at which the acceleration current is output by the acceleration current source 340.

FIG. 4 is a schematic diagram depicting example temperature dependent acceleration current source circuitry 410, which is an example of the temperature dependent acceleration current source circuitry 310 of FIG. 3. The acceleration current source circuitry 410 includes current source circuitry 320 as earlier described. The acceleration current source circuitry 410 also includes temperature sensing circuitry 450, which is an example of temperature sensing circuitry 250 of FIG. 2. Temperature sensing circuitry 450 includes resistors R1 and R2, and first temperature sensitive device 460 and second temperature device 470, which are examples of first temperature sensitive device 460 and second temperature sensitive device 270, respectively.

The first temperature sensitive device 460 includes six PMOS transistors Q23, Q24, Q25, Q26, Q27, and Q28. The drain of transistor Q12 is coupled to the respective bodies of transistors Q23, Q24, Q25, Q26, Q27, and Q28. The respective drains of transistors Q23, Q24, Q25, Q26, Q27, and Q28 are coupled to the common node 303. The source of a one of the MOS transistors (e.g., Q28 in the illustrated example) is coupled to the drain of transistor Q12. The respective sources of the remaining transistors (e.g., Q23, Q24, Q25, Q26, and Q27 in the illustrated example) are left open (unconnected).

The body leakage of the six PMOS transistors Q23, Q24, Q25, Q26, Q27, and Q28 contributes to the leakage current BIAS. There is no leakage through the source-to-drain channel of the unconnected transistors Q23, Q24, Q25, Q26, and Q27 and thus leakage through the source-to-drain channel of these transistors does not contribute to the leakage current BIAS. However, the leakage through the source-to-drain channel of the transistor Q28 contributes to the leakage current BIAS.

The second temperature sensitive device 470 includes six MOS transistors Q29, Q30, Q31, Q32, Q33, and Q34. The drain of transistor Q3 is coupled to the respective bodies of transistors Q29, Q30, Q31, Q32, Q33, and Q34. The respective drains of transistors Q29, Q30, Q31, Q32, Q33, and Q34 are coupled to the common node 303. The respective sources of transistors Q29, Q30, Q31, Q32, Q33, and Q34 are coupled to the drain of transistor Q3.

The body leakage of the six PMOS transistors Q29, Q30, Q31, Q32, Q33, and Q34 contributes to the leakage current TRIG. Leakage through the source-to-drain channel of transistors Q29, Q30, Q31, Q32, Q33, and Q34 contribute to the leakage current TRIG.

In this example, the number of PMOS transistors in the first temperature sensitive device 460 matches the number of PMOS transistors in the second temperature sensitive device 470. The PMOS transistors Q23, Q24, Q25, Q26, Q27, and Q28 of the first temperature sensitive device 460 are matched to the MOS transistors Q29, Q30, Q31, Q32, Q33, and Q34 of the second temperature sensitive device 470. Thus the leakage currents exhibited by both devices 460, 470 to behave similarly or in the same way.

Because the MOS transistors of the first temperature sensitive device 460 are matched to the MOS transistors of the second temperature sensitive device 470, and all of the bodies of the MOS transistors in devices 460, 470 are contributing to the leakage current, the contribution of body leakage current to the BIAS current and the TRIG current should be the same as temperature changes. Thus body leakage effects do not contribute to the temperature based variance in the differential between the BIAS and TRIG voltages and the body leakage effects are not a significant factor in triggering the output of the acceleration current.

The sources of all of the MOS transistors Q29, Q30, Q31, Q32, Q33, Q34 are coupled to the trigger MOS device Q3 so that leakage through all of the source-to-drain channels of the MOS transistors Q29, Q30, Q31, Q32, Q33, Q34 contributes to the leakage current TRIG. Thus, while only one source-to-drain leakage path (associated with MOS transistor Q28) in the first temperature sensitive device 460 contributes the BIAS current, six source-to-drain leakage paths (associated with MOS transistors Q29, Q30, Q31, Q32, Q33, Q34) in the second temperature sensitive device 470 contributes the TRIG current. This difference in source-to-drain leakage contributions between the devices 460 and 470 causes the first rate of change of BIAS current with respect to temperature to differ from the second rate of change of the TRIG current with respect to temperature. In other words, temperature dependent subthreshold and punch though source-to-drain leakage form the basis of operation for the temperature dependent acceleration current source circuitry 410.

A six to one ratio between the source coupled MOS transistors (e.g., having a source coupled to the diode device 332) of the second temperature sensitive device 470 and the source coupled MOS transistor of the first temperature sensitive device 460 is used in the example. However, any other numbers of MOS transistors and numbers of source-coupled MOS transistors may be used that yield a desired ratio in the first rate of change of BIAS current with respect to temperature different from the second rate of change of the TRIG current with respect to temperature. This ratio is another factor that determines the threshold temperature for the temperature dependent acceleration current source circuitry 410.

Figure 5:
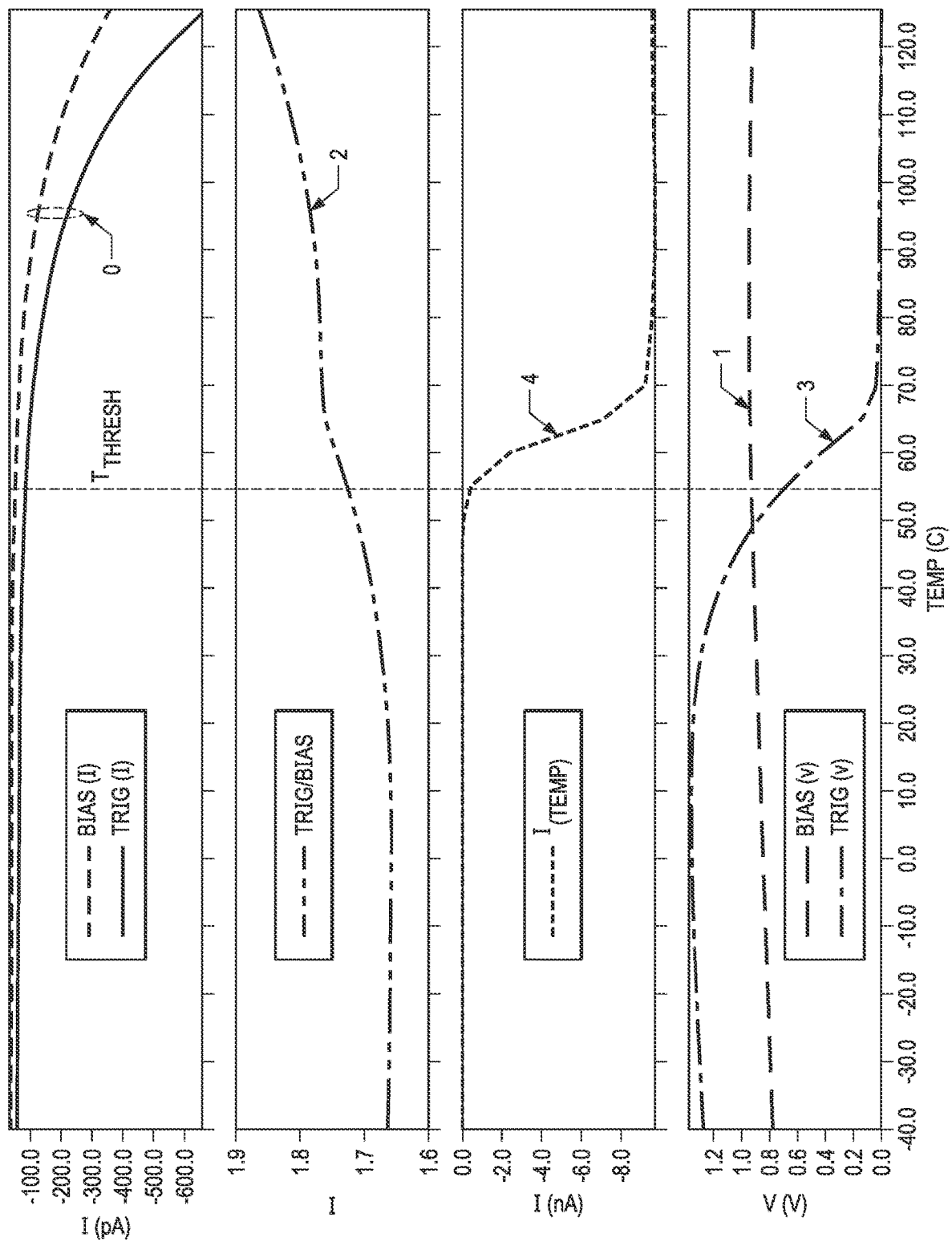
FIG. 5 is a plot of various electrical signals during operation of the temperature dependent acceleration current source circuitry of FIG. 4 responsive to temperature changes.

FIG. 5 is a plot of various electrical signals generated during operation of the temperature dependent acceleration current source circuitry 410 of FIG. 4 responsive to temperature changes. Curves labeled 0 illustrate the BIAS current and the TRIG current. The BIAS current does not vary as much as the TRIG current as the temperature increases. Curve labeled 1 illustrates the BIAS voltage generated by the leakage current through the first temperature sensitive device 460 which remains fairly constant across the temperature range. Curve labeled 2 represents the ratio TRIG/BIAS for the leakage currents. As the TRIG current varies more significantly than the BIAS current responsive to temperature changes, the ratio TRIG/BIAS grows. Curve labeled 3 depicts the TRIG voltage which determines whether the trigger MOS transistor Q3 is in triode or saturation region. As the TRIG voltage increases with temperature, the trigger MOS transistor Q3 approaches saturation until, at $T_{THRESH}$, the trigger MOS transistor Q3 enters saturation region and the acceleration current begins to flow. Curve labeled 4 illustrates the acceleration current that is output by the temperature dependent acceleration current source circuitry 410. Because the curve labeled 4 is in terms of negative current, the downward slope indicates an increase in output current.

One application of the described temperature dependent acceleration current source circuitry is a watchdog timer circuit that, for example, triggers the refreshing of capacitors used in a sample-and-hold reference system of an ultra-low power buck boost converter. The refresh rate should increase as temperature increases due to the temperature effects on discharge rate for capacitors in the sample-and-hold reference system.

Figure 6:
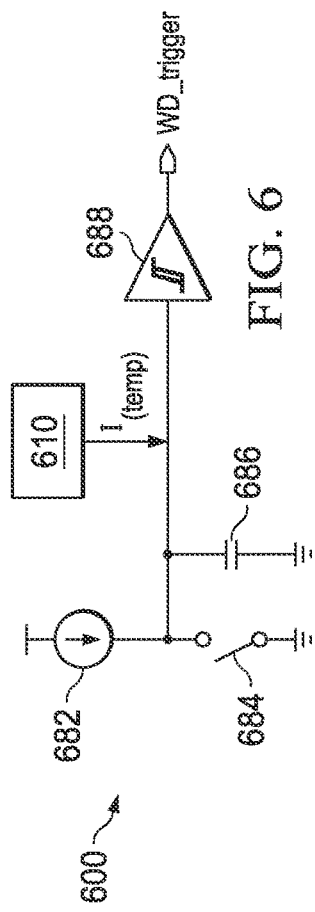
FIG. 6 is a block diagram depicting an example watchdog circuit that includes a temperature dependent acceleration current source circuitry, according to one aspect of the description.

FIG. 6 is a block diagram depicting an example watchdog timer circuit 600 that includes temperature dependent acceleration current source circuitry 610, a current source 682, a switch 684, an integration capacitor 686, and an integrator circuit 688. In an example, the current source 682 is or includes a PTAT current source that provides a current that charges the integration capacitor 686. The integrator circuit 688 generates an output pulse in response to the voltage across the integration capacitor 686 reaching a threshold. This output pulse serves as a watchdog trigger signal (WD_trigger) that may be used to trigger the refresh of capacitors in a sample-and-hold reference system. The output pulse also closes a reset switch 684 to drain the integration capacitor 686 and reset the watchdog timer circuit 600.

If the current from the current source 682 remains constant (indicating no change in ambient temperature), the rate at which the watchdog trigger signal is generated will remain constant because the time needed to charge the integration capacitor 686 is constant. As temperature increases, the current from the current source 682 increases, which increases the rate at which the watchdog trigger signal is generated because the integration capacitor 686 charges more quickly. It is possible that at some higher threshold temperature, the refresh rate needed for proper functioning of the sample-and-hold reference system increases in an accelerated manner that outpaces the increase in the watchdog trigger signal rate that would be caused by the increase in the current from the current source 682.

At lower temperatures and until the current threshold is reached the temperature dependent acceleration current source circuitry 610 does not output an acceleration current. However, at the threshold temperature, the temperature dependent acceleration current source circuitry 610 outputs an acceleration current that additionally charges the integration capacitor 686 along with the current 682 from the PTAT current source. The addition of the acceleration circuit significantly reduces the time it takes to charge the integration capacitor 686 and in turn significantly increases the rate of the watchdog trigger signal. This allows for compensation of a rapid change in the rate of temperature induced variation in component performance and avoids potential runaway or cascade failure scenarios.

In one example, circuits 310, 410, and 600 are included on a single integrated circuit (IC) or piece of silicon. In other examples, various components of circuits 310, 410, and 600 may be included on different ICs or pieces of silicon.

Figure 7A:
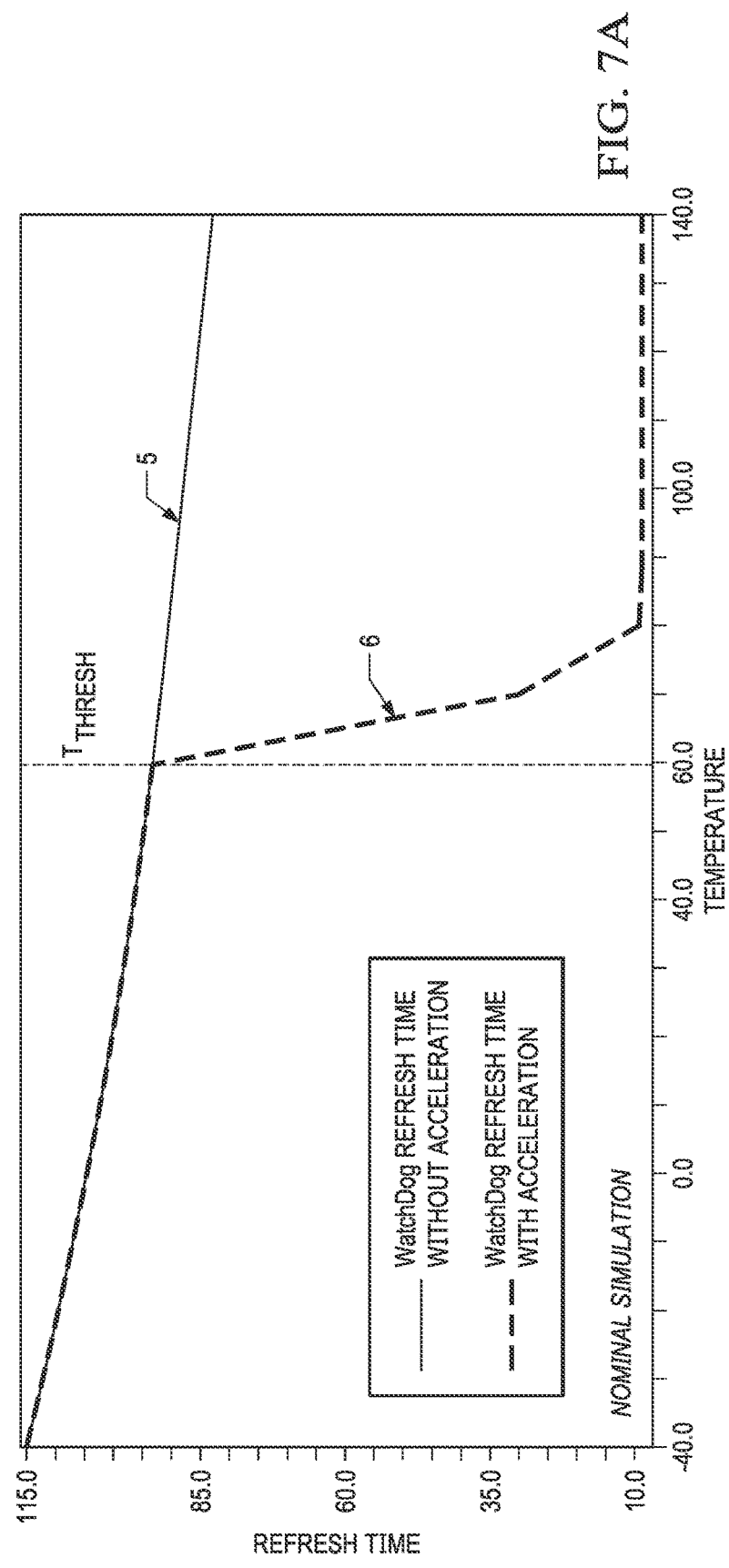
FIGS. 7A-7D are plots of reset time of the watchdog circuit of FIG. 6 versus temperature for nominal and process corners, with the temperature dependent acceleration current source circuitry enabled and disabled.

FIG. 7A illustrates a nominal simulation of a refresh time of the watchdog timer circuit 600 of FIG. 6 responsive to temperature changes. Curve labeled 5 illustrates the refresh time (inverse of refresh rate) when the temperature dependent acceleration current source circuitry 610 is disabled. It can be seen that the refresh time decreases in an approximately linear fashion as the current 682 from the PTAT current source increases in an approximately linear fashion. Curve labeled 6 illustrates the refresh time when the temperature dependent acceleration current source circuitry 610 is enabled. At the threshold temperature, the refresh time drops significantly in response to the addition of the acceleration current output by the temperature dependent acceleration current source circuitry 610 to more quickly charge the integration capacitor 686.

Figure 7B:
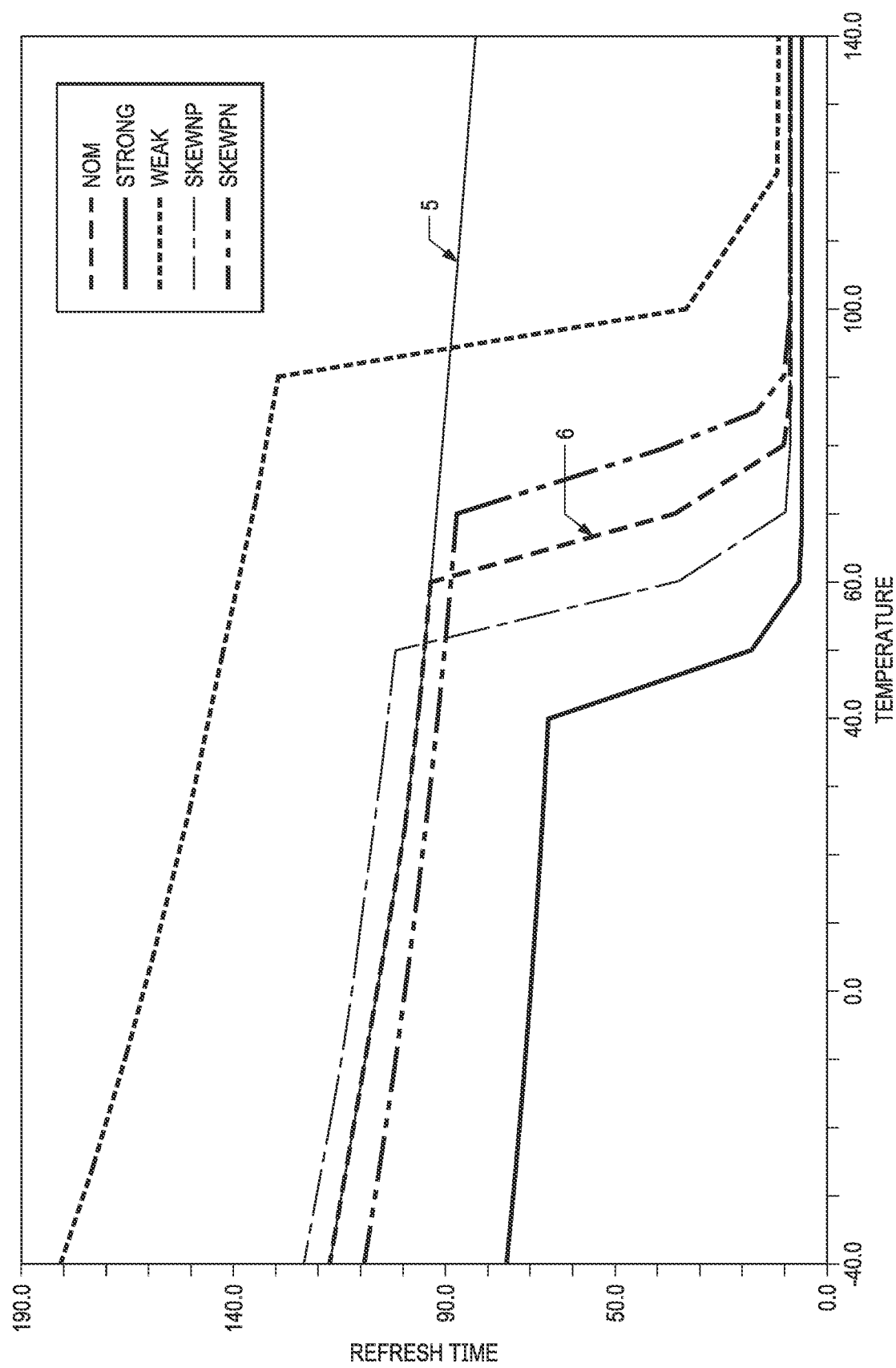
Figure 7C:
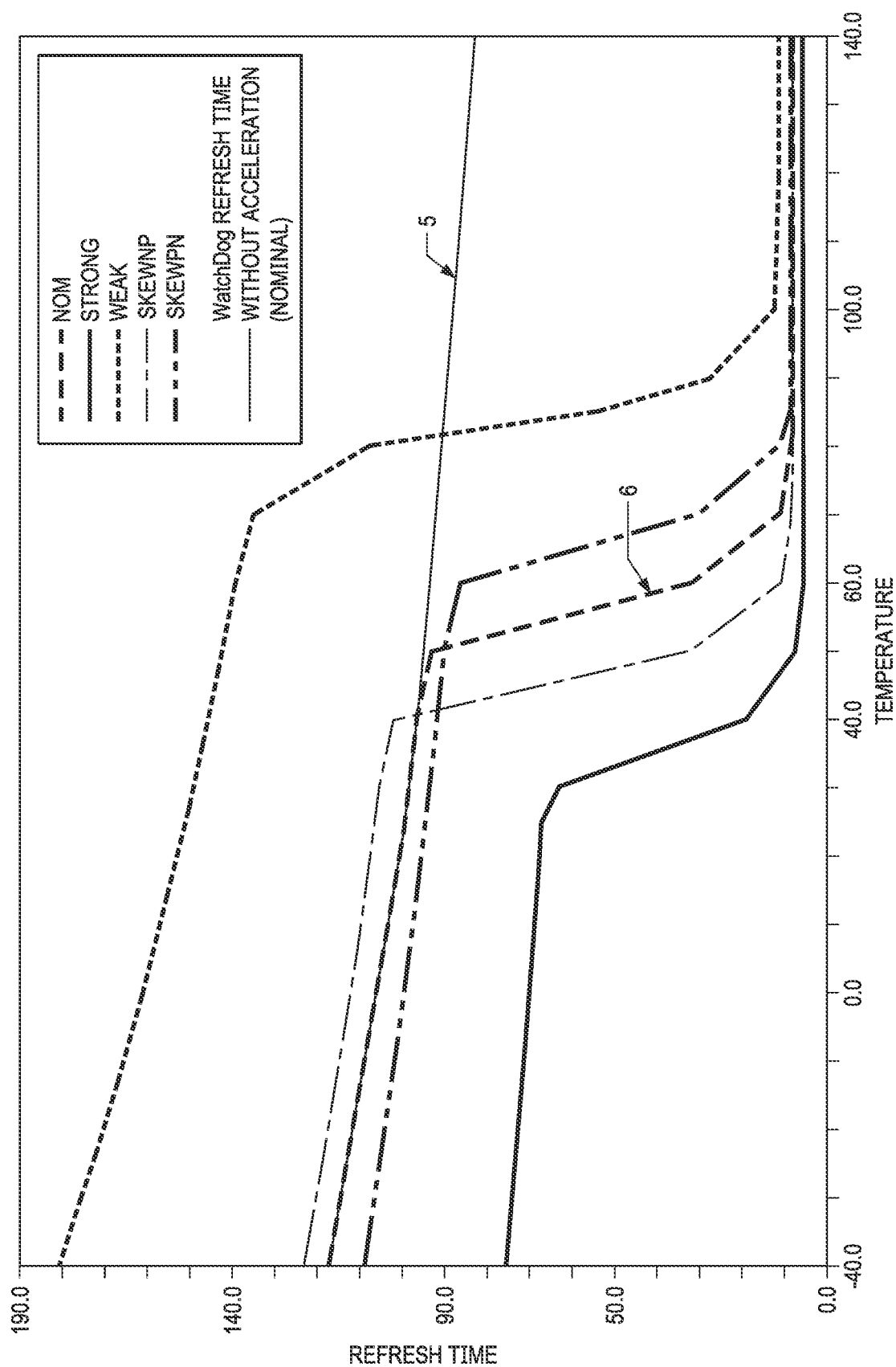
Figure 7D:
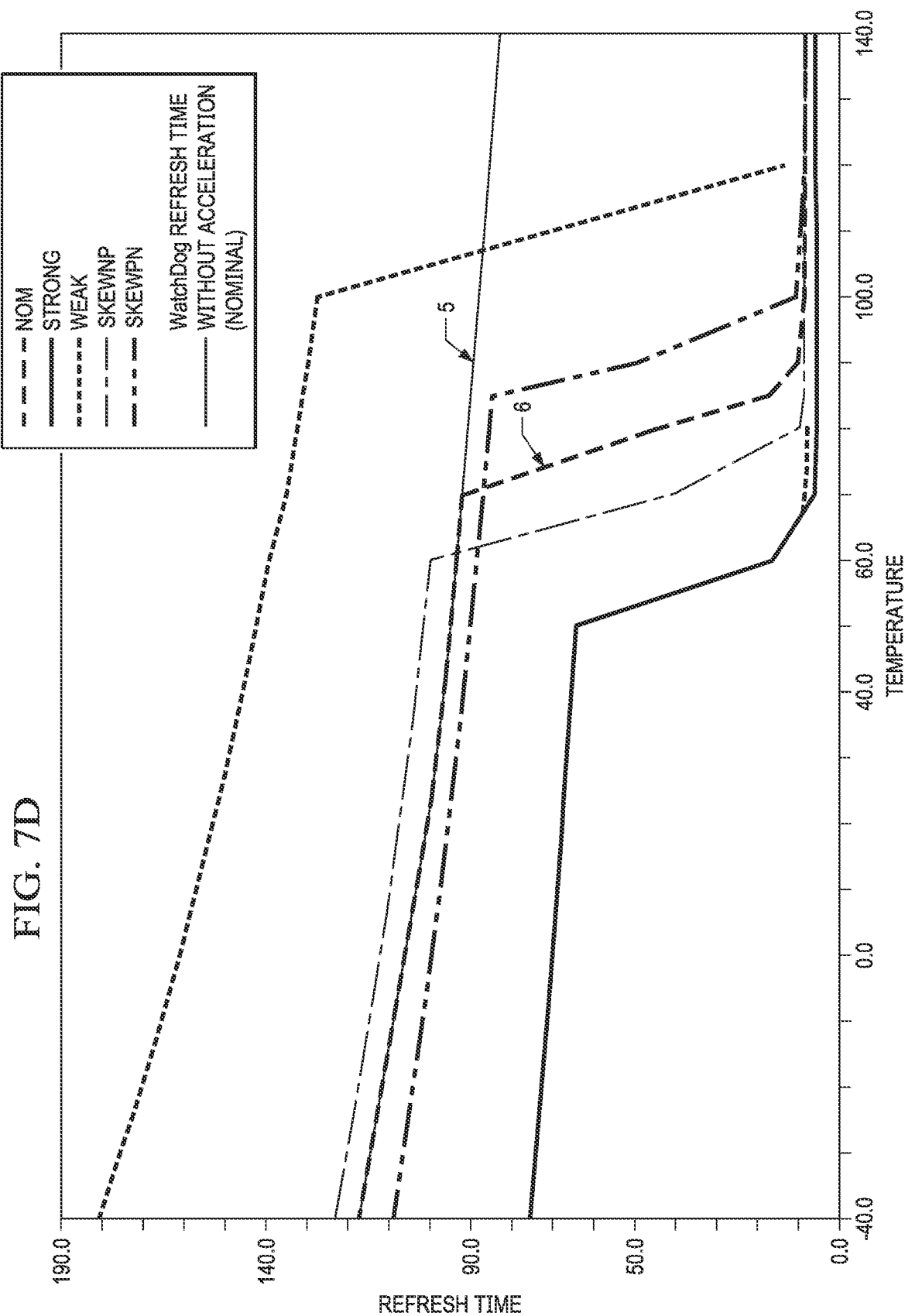

FIGS. 7B-7C illustrate refresh times for respective temperature selection input combinations. Different process corners are illustrated as well to show the various in the threshold temperature caused by process variation. FIG. 7B illustrates the refresh time for the watchdog timer circuit when the $T_{sel1}$ is low and $T_{sel2}$ is high, which results in a threshold temperature for a nominal process of around 60° C. A range of around 50° C. for threshold temperature is exhibited between strong and weak process corners. FIG. 7C illustrates the refresh time for the watchdog timer circuit when $T_{sel2}$ is low, which results in a lower threshold temperature for a nominal process of around 50° C. A range of around 50° C. for threshold temperature is exhibited between strong and weak process corners. FIG. 7D illustrates the refresh time for the watchdog timer circuit when $T_{sel1}$ and $T_{sel2}$ are both high, which results in a higher threshold temperature for a nominal process of around 70° C. A range of around 50° C. for threshold temperature is exhibited between strong and weak process corners.

Figure 8:
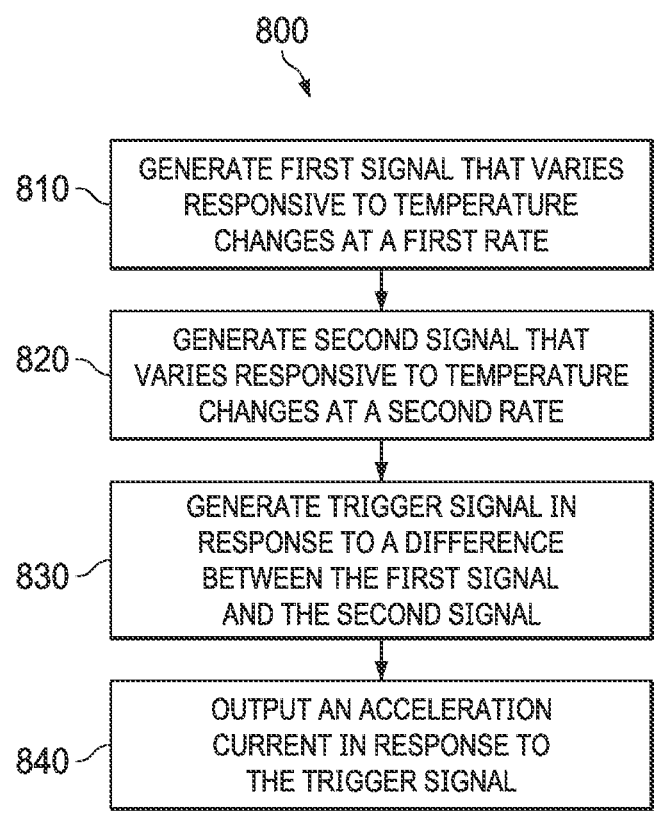
FIG. 8 is a flow diagram depicting an example method for providing an acceleration current, according to one aspect of the description.

FIG. 8 is a flow diagram depicting an example method 800 for providing an acceleration current. The method 800 may be performed, for example by circuits 110, 210, 310, 410, 610 of FIGS. 1A, 2, 3, 4, and 6, respectively. The method includes, at 810, generating a first signal that varies responsive to temperature changes according to a first rate. The method includes, at 820, generating a second signal that varies responsive to temperature changes according to a second rate. At 830, a trigger signal is generated in response to a difference between the first signal and the second signal exceeding a threshold. An acceleration current is output in response to the trigger signal at 840.

In one example, the first signal is generated with a first temperature sensitive device that exhibits a first leakage current that varies responsive to temperature changes according to the first rate and the second signal is generated with a second temperature sensitive device that exhibits a second leakage current that varies responsive to temperature changes according to the second rate. The trigger signal corresponds to a drain current of a trigger MOS transistor having a gate coupled to the first temperature sensitive device and a drain coupled to the second sensitive device, wherein the trigger MOS transistor enters saturation region in response to a difference between the first leakage current and the second leakage current exceeding a threshold. The first leakage current may be generated with a first plurality of metal oxide semiconductor (MOS) transistors. A body of each MOS transistor in the first plurality conducts a respective portion of the first leakage current and sources of a first number of the MOS transistors in the first plurality conduct respective portions of the first leakage current while sources of a remainder of the first plurality of MOS transistors are open. The second leakage current may be generated with a second plurality of MOS transistors. A body of each MOS transistor in the second plurality conducts a respective portion of the second leakage current. Sources of a second number of the MOS transistors in the second plurality conduct respective portions of the second leakage current while sources of a remainder of the second plurality of MOS transistors are open. In one example the ratio of the first number to the second number is 1 to 6.

In one example, a bias voltage is generated with a diode device, wherein the diode device is coupled in series with the first temperature sensitive device and is biased by the first leakage current. The diode device includes a third plurality of MOS transistors coupled in series, wherein each MOS transistor in the third plurality has a gate coupled to the bias voltage. The bias voltage is provided to the gate of trigger MOS transistor. In one example, the bias voltage is adjusted by selectively activating one or more MOS transistors that form shorting paths around respective one or more of the MOS transistors in the third plurality.

As described above, providing a temperature dependent acceleration current source enables compensation for rapid changes in temperature dependent performance of electronic devices that occur at a particular temperature within the operating range.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

In the description and in the claims, the terms "including" and "having" and variants thereof are intended to be inclusive in a manner similar to the term "comprising" unless otherwise noted. Unless otherwise stated, "about," "approximately," or "substantially" preceding a value means +/−10 percent of the stated value. In another example, "about," "approximately," or "substantially" preceding a value means +/−5 percent of the stated value. IN another example, "about," "approximately," or "substantially" preceding a value means +/−1 percent of the stated value.

The term "couple", "coupled", "couples", and variants thereof, as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. Moreover, the terms "couple", "coupled", "couples", or variants thereof, includes an indirect or direct electrical or mechanical connection.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Although not all separately labeled in the FIGS., components or elements of systems and circuits illustrated therein have one or more conductors or terminus that allow signals into and/or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically and/or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, "terminal", "node", "interconnect", "pad", and "pin" may be used interchangeably.

Modifications are possible in the described examples, and other implementations are possible, within the scope of the claims.

What is claimed is:

1. Temperature based acceleration current source circuitry, comprising:
    differential trigger circuitry, comprising:
        a diode device biased by a first leakage current to provide a bias voltage; and
        a trigger device biased by the bias voltage;
    a first temperature sensitive device coupled between the diode device and a common terminal, wherein the first leakage current flows through the first temperature sensitive device, and the first leakage current varies in response to temperature changes at a first rate;
    a second temperature sensitive device coupled between the trigger device and the common terminal, wherein a second leakage current flows through the second temperature sensitive device, and the second leakage current varies in response to temperature changes at a second rate; and
    an acceleration current source coupled to the trigger device, wherein the acceleration current source is configured to, in response to activation by the trigger device, conduct an acceleration current provided by a voltage source to an output of the temperature based acceleration current source circuitry,
    wherein the trigger device activates the acceleration current source responsive to a difference between the first leakage current and the second leakage current.

2. The temperature based acceleration current source circuitry of claim 1, wherein:

the first temperature sensitive device includes a first plurality of metal oxide semiconductor (MOS) transistors coupled in parallel between the diode device and the common terminal, wherein a body of each respective MOS transistor in the first plurality of MOS transistors is coupled to the diode device and conducts a respective portion of the first leakage current, each respective source of a first number of the MOS transistors in the first plurality of MOS transistors is coupled to the diode device and conducts respective portions of the first leakage current, and each respective source of a remainder of the first plurality of MOS transistors is unconnected; and the second temperature sensitive device includes a second plurality of MOS transistors coupled in parallel between the trigger device and the common terminal, a body of each respective MOS transistor in the second plurality of MOS transistors is coupled to a gate of the trigger device and conducts a respective portion of the second leakage current, each respective source of a second number of the MOS transistors in the second plurality of MOS transistors is coupled to the gate of the trigger device and conducts respective portions of the second leakage current, and each respective source of a remainder of the second plurality of MOS transistors is unconnected.

3. The temperature based acceleration current source circuitry of claim 2, wherein the first plurality of MOS transistors includes a same number of MOS transistors as the second plurality of MOS transistors, and the remainder of the second plurality of MOS transistors includes zero MOS transistors.

4. The temperature based acceleration current source circuitry of claim 1, wherein the diode device comprises a third plurality of MOS transistors coupled in series, and each respective MOS transistor in the third plurality of MOS transistors has a gate coupled to the bias voltage.

5. The temperature based acceleration current source circuitry of claim 4, wherein the differential trigger circuitry includes trigger temperature selection circuitry having a fourth plurality of transistors, in which each respective transistor in the fourth plurality of transistors is coupled in parallel with a respective MOS transistor in the third plurality of MOS transistors, and each respective transistor in the fourth plurality of transistors has a gate coupled to a respective temperature selection input.

6. The temperature based acceleration current source circuitry of claim 1, wherein the trigger device includes a MOS transistor coupled to gates of series-coupled MOS transistors, and the MOS transistor enters a saturation region of operation activates the series-coupled MOS transistors in response to a difference between the first leakage current and the second leakage current reaching a threshold.

7. A watchdog circuit, comprising:
an integrator circuit configured to provide an output pulse in response to an input voltage exceeding a threshold;
a capacitor coupled in parallel with the integrator circuit, wherein the capacitor is coupled to a proportional to absolute temperature (PTAT) circuit and charged by a current provided by the PTAT circuit, and a voltage across the capacitor corresponds to the input voltage to the integrator circuit; and
temperature based acceleration current source circuitry coupled to the capacitor, wherein an acceleration current provided at an output of the temperature based acceleration current source circuitry charges the capacitor, and the temperature based acceleration current source circuitry is configured to selectively provide the acceleration current in response to an ambient temperature reaching a target.

8. The watchdog circuit of claim 7, wherein the temperature based acceleration current source circuitry including:
differential trigger circuitry, comprising:
a diode device biased by a first leakage current and configured to provide a bias voltage; and
a trigger device biased by the bias voltage;
a first temperature sensitive device coupled between the diode device and a common terminal, wherein the first leakage current flows through the first temperature sensitive device, and the first leakage current varies responsive to temperature changes at a first rate;
a second temperature sensitive device coupled between the trigger device and the common terminal, wherein a second leakage current flows through the second temperature sensitive device, and the second leakage current varies responsive to temperature changes at a second rate; and
an acceleration current source coupled to the trigger device, wherein the acceleration current source is configured to, in response to activation by the trigger device, conduct an acceleration current provided by a voltage source to an output of the temperature based acceleration current source circuitry,
wherein the trigger device selectively activates the acceleration current source responsive to a difference between the first leakage current and a second leakage current.

9. The watchdog circuit of claim 8, wherein
the first temperature sensitive device includes a first plurality of metal oxide semiconductor (MOS) transistors coupled in parallel between the diode device and the common terminal, wherein a body of each respective MOS transistor in the first plurality of MOS transistors is coupled to the diode device and conducts a respective portion of the first leakage current, and each respective source of a first number of the MOS transistors in the first plurality of MOS transistors is coupled to the diode device and conducts respective portions of the first leakage current, and each respective source of a remainder of the first plurality of MOS transistors is unconnected; and
the second temperature sensitive device includes a second plurality of MOS transistors coupled in parallel between the trigger device and the common terminal, wherein a body of each respective MOS transistor in the second plurality of MOS transistors is coupled to a gate of the trigger device and conducts a respective portion of the second leakage current, each respective source of a second number of the MOS transistors in the second plurality of MOS transistors is coupled to the gate of the trigger device and conducts respective portions of the second leakage current, and each respective source of a remainder of the second plurality of MOS transistors is unconnected.

10. The watchdog circuit of claim 8, wherein the diode device includes a third plurality of MOS transistors coupled in series, and each respective MOS transistor in the third plurality of MOS transistors has a gate coupled to the bias voltage.

11. The watchdog circuit of claim 10, wherein the differential trigger circuitry includes trigger temperature selection circuitry having a fourth plurality of transistors, wherein each respective transistor in the fourth plurality of transistors is coupled in parallel with a respective MOS transistor in the third plurality of MOS transistors, and each respective transistor in the fourth plurality of transistors has a gate coupled to a respective temperature selection input.

12. The watchdog circuit of claim 8, wherein the trigger device includes a MOS transistor coupled to respective gates of series-coupled MOS transistors, the MOS transistor enters a saturation region of operation and activates the series-coupled MOS transistors in response to a difference between the first leakage current and the second leakage current reaching a threshold.

13. A method, comprising:
generating a first signal that varies responsive to temperature changes according to a first rate;
generating a second signal that varies responsive to temperature changes according to a second rate;
generating a trigger signal in response to a difference between the first signal and the second signal exceeding a threshold; and
providing an acceleration current in response to the trigger signal.

14. The method of claim 13, further comprising:
generating the first signal with a first temperature sensitive device that exhibits a first leakage current that varies responsive to temperature changes according to the first rate;
generating the second signal with a second temperature sensitive device that exhibits a second leakage current that varies responsive to temperature changes according to the second rate; and
generating the trigger signal corresponding to a drain current of a trigger MOS transistor having a gate coupled to the first temperature sensitive device and a drain coupled to the second temperature sensitive device, wherein the trigger MOS transistor enters saturation region in response to a difference between the first leakage current and the second leakage current exceeding a threshold.

15. The method of claim 14, further comprising:
generating the first leakage current with a first plurality of metal oxide semiconductor (MOS) transistors, wherein a body of each respective MOS transistor in the first plurality of MOS transistors conducts a respective portion of the first leakage current, each respective source of a first number of the MOS transistors in the first plurality of MOS transistors conducts respective portions of the first leakage current, and each respective source of a remainder of the first plurality of MOS transistors is unconnected; and
generating the second leakage current with a second plurality of MOS transistors, wherein a body of each respective MOS transistor in the second plurality of MOS transistors conducts a respective portion of the second leakage current, wherein each respective source of a second number of the MOS transistors in the second plurality of MOS transistors conducts a respective portion of the second leakage current, and each respective source of a remainder of the second plurality of MOS transistors is unconnected.

16. The method of claim 15, wherein a ratio of the first number to the second number is 1 to 6.

17. The method of claim 14, further comprising:
generating a bias voltage at a bias voltage terminal using a diode device, wherein the diode device is coupled in series with the first temperature sensitive device and is biased by the first leakage current, wherein the diode device includes a third plurality of MOS transistors coupled in series, wherein each MOS transistor in the third plurality of MOS transistors has a gate coupled to the bias voltage terminal; and
providing the bias voltage to the gate of the trigger MOS transistor.

18. The method of claim 17, comprising:
adjusting the bias voltage by selectively activating one or more MOS transistors that form shorting paths around respective one or more of the MOS transistors in the third plurality of MOS transistors.

19. Temperature based acceleration current source circuitry, comprising:
a first temperature sensitive device configured to provide a first signal that varies responsive to temperature changes at a first rate;
a second temperature sensitive device configured to provide a second signal that varies responsive to temperature changes at a second rate;
differential trigger circuitry configured to provide a trigger signal responsive to a difference between the first signal and the second signal; and
acceleration current source circuitry configured to provide an acceleration current in response to the trigger signal.

20. The temperature based acceleration current source circuitry of claim 19, wherein:
the first temperature sensitive device provides a first leakage current that varies in response to temperature changes according to the first rate;
the second temperature sensitive device provides a second leakage current that varies in response to temperature changes according to the second rate; and
the differential trigger circuitry is configured to provide the trigger signal in response to a difference between a trigger voltage generated by the second leakage current and a bias voltage generated by the first leakage current exceeding a threshold.

21. The temperature based acceleration current source circuitry of claim 20, wherein:
the first temperature sensitive device includes a first plurality of metal oxide semiconductor (MOS) transistors coupled in parallel between the differential trigger circuitry and a common terminal, wherein a body of each respective MOS transistor in the first plurality of MOS transistors is coupled to the differential trigger circuitry and conducts the first leakage current, each respective source of a first number of the MOS transistors in the first plurality of MOS transistors is coupled to the differential trigger circuitry and conducts the first leakage current, and each respective source of a remainder of the first plurality of MOS transistors is unconnected; and
the second temperature sensitive device includes a second plurality of MOS transistors coupled in parallel between the differential trigger circuitry and the common terminal, wherein a body of each respective MOS transistor in the second plurality of MOS transistors is coupled to the differential trigger circuitry and conducts the second leakage current, each respective source of a second number of the MOS transistors in the second plurality of MOS transistors is coupled to the differential trigger circuitry and conducts the second leakage current, and each respective source of a remainder of the second plurality of MOS transistors is unconnected.

22. The temperature based acceleration current source circuitry of claim 21, wherein a ratio of the first number to the second number is 1 to 6.

23. The temperature based acceleration current source circuitry of claim 22, wherein the differential trigger circuitry includes:
- a diode device coupled in series with the first temperature sensitive device and biased by the first leakage current to provide the bias voltage; and
- a trigger device including a trigger MOS transistor having a gate coupled to the diode device, a drain coupled to the second temperature sensitive device, and an enable input coupled to the acceleration current source circuitry, wherein the trigger signal corresponds to a voltage at the drain of the trigger MOS transistor.

24. The temperature based acceleration current source circuitry of claim 23, wherein the diode device includes a third plurality of MOS transistors coupled in series, and each respective MOS transistor in the third plurality of MOS transistors has a respective gate coupled to the bias voltage.

25. The temperature based acceleration current source circuitry of claim 24, wherein the differential trigger circuitry includes trigger temperature selection circuitry having a fourth plurality of transistors, wherein each transistor in the fourth plurality of transistors is coupled in parallel with a respective MOS transistor in the third plurality of MOS transistors, and each transistor in the fourth plurality of transistors has a respective gate coupled to a respective temperature selection input.

* * * * *